No. 12,177. REISSUED NOV. 24, 1903.

M. HEINEKE.

STRAW STACKER.

APPLICATION FILED FEB. 14, 1903.

2 SHEETS—SHEET 1.

Witnesses

Adelaide Kearns.

J. A. Walsh.

Inventor

Martin Heineke,

By

Bradford & Hood

Attorneys.

THE NORRIS PETERS CO., PHOTO-LITHO., WASHINGTON, D. C.

No. 12,177. REISSUED NOV. 24, 1903.

M. HEINEKE.

STRAW STACKER.

APPLICATION FILED FEB. 14, 1903.

2 SHEETS—SHEET 2.

Witnesses
Adelaide Kearns.
J. A. Walsh.

Inventor
Martin Heineke,
By
Bradford & Hood
Attorneys.

THE NORRIS PETERS CO., PHOTO-LITHO., WASHINGTON, D. C.

No. 12,177. Reissued November 24, 1903.

UNITED STATES PATENT OFFICE.

MARTIN HEINEKE, OF SPRINGFIELD, ILLINOIS, ASSIGNOR, BY MESNE ASSIGNMENTS, TO THE SATTLEY STACKER COMPANY, OF INDIANAPOLIS, INDIANA, A CORPORATION OF MAINE.

STRAW-STACKER.

SPECIFICATION forming part of Reissued Letters Patent No. 12,177, dated November 24, 1903.

Original No. 679,148, dated July 23, 1901. Application for reissue filed February 14, 1903. Serial No. 143,461.

*To all whom it may concern:*

Be it known that I, MARTIN HEINEKE, a citizen of the United States, residing at Springfield, in the county of Sangamon and State of Illinois, have invented certain new and useful Improvements in Straw-Stackers, of which the following is a specification.

This invention relates to that class of stackers adapted to receive straw from a separator and carry the same therefrom by means of a mechanical carrier, and has for its object superior means for positively transferring the straw from the straw-discharging portion of the separator to the receiving end of the mechanical carrier.

Figure 1:
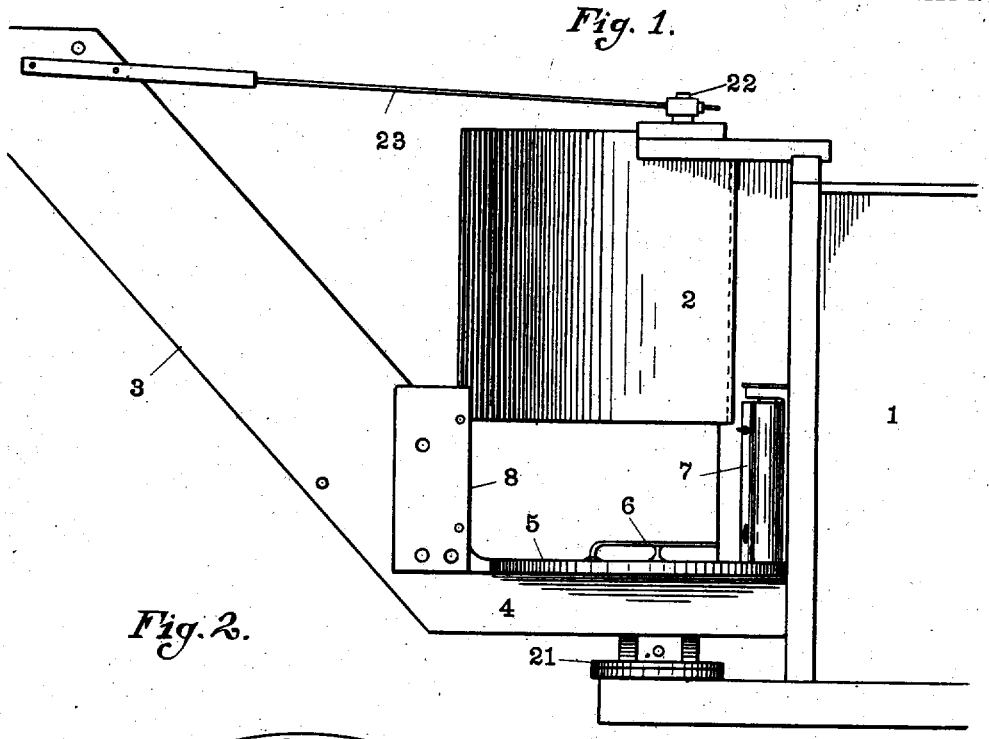
Figure 2:
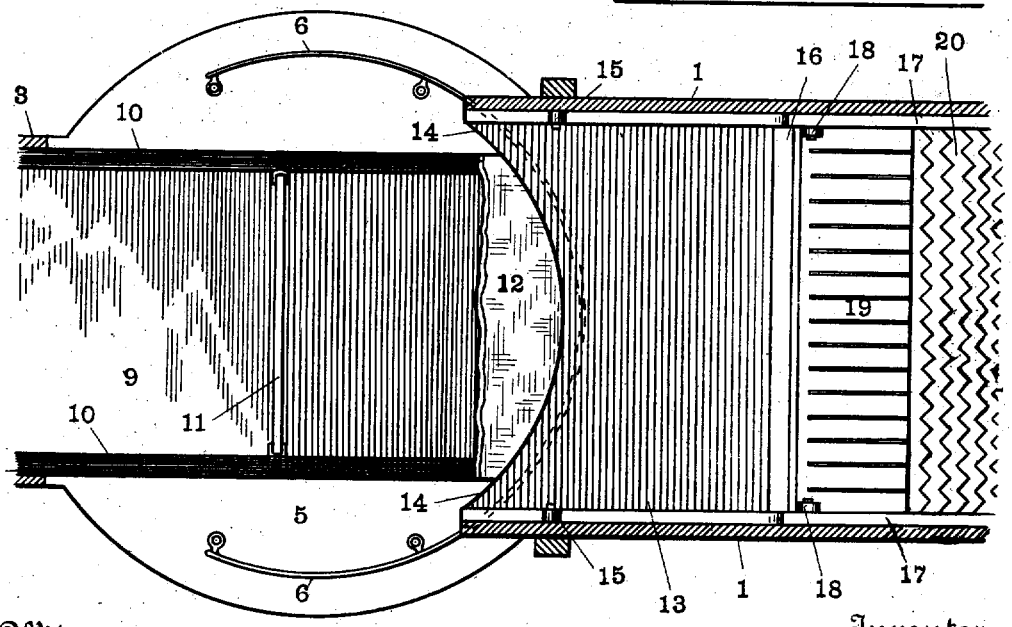
Figure 3:
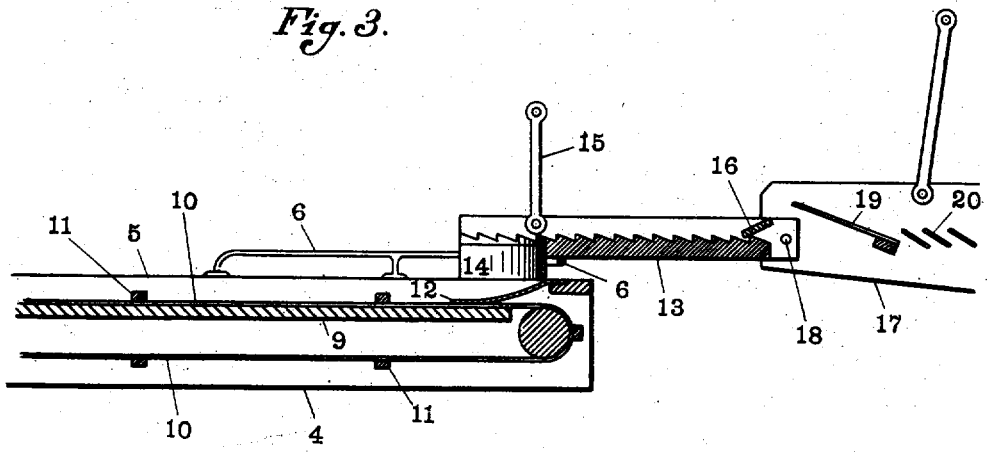

In the accompanying drawings, which illustrate my invention, Figure 1 is a side elevation of the discharge end of a separator and the receiving end of a stacker of the type mentioned connected therewith, only so much of the separator and stacker being shown as are needed to explain my invention. Fig. 2 is a horizontal section on a large scale and extending farther into the separator, so as to show the discharging and transfering means. Fig. 3 is a vertical section showing the relative position of the discharge end of the chaffer-shoe or straw-discharger of the stacker, the receiving end of the mechanical carrier, and the intermediate transferring means or shaker-pan.

The rear end of a separator is represented in general outline at 1. At 2 is shown a hood, through which light particles are delivered to the stacker. At 3 is shown the general outlines of the horizontally-swinging section of the stacker, and at 4 is shown the horizontal receiving end of the stacker-section 3. The part 4 is the same width as the upwardly-extended part 3, and on its upper surface is a circular table 5, which is recessed in line with the drag-belt to admit straw to the belt. Upon the table 5 is a raised rail 6, approximately conforming to the curvature of the hood 2, or the rear part thereof, and affording a bearing for the lower end of an extending flap used to inclose the space between the lower end of the hood and the upper surface of the table. The flap is shown rolled up at 7, and at 8 is shown the part of the stacker with which the flap is connected when it is in use. A pair of belts 10 runs through the horizontal part 4 of the stacker, receiving the straw and carrying it up the stacker, and slats 11 are attached to the belts and act as drags therefor. The drag-belts are below the table 5, and they run over the board 9 in their operative motion. The discharge end of a chaffer-shoe is shown at 17. Separating-slats for the chaffer are shown at 20, and tail-fingers of the chaffer are shown at 19. The chaffer shown is merely typical of the various shaking separator-shoes or straw-discharging mechanism in common use, and it has no connection with my invention further than to illustrate a straw-discharging device.

All the mechanism hereinbefore described is old, and it is in the mechanism intervening between the discharge end of the chaffer-shoe or other discharging means and the receiving end of the stacker that my invention resides. This mechanism consists of a mechanical transferring means arranged between the chaffer-shoe or straw-discharger of the separator and the receiving end of the mechanical carrier or drag-belt. In the drawings this transferring means is illustrated as a pan 13, which is hinged at its front to the rear end of the chaffer-shoe on horizontal pivots 18, while its rear end rests on or is supported near the front end of the table above rail 6, and a strip 14, which is preferably somewhat elastic or yielding, extends from the rear end of the pan down to or near the table. The strip 14 serves to prevent material from accumulating upon the table and to scrape it into the medial depression when said table is swung upon its pivot to positions where the line of travel of the drag-belt is at an angle to the line of delivery of the material from the separator. The rear end of the pan is preferably concaved to conform to the curvature of the rail 6, and its upper surface is preferably serrated or corrugated to facilitate the travel of the straw from the chaffer to the carrier. Links 15 are shown supporting the rear end of the pan in a manner to permit horizontal motion; but these are only typical of any support that will permit such horizontal movement.

A flap is shown at 16 overlapping the receiving end of the pan, and at 12 is shown a flap overlapping the receiving end of the stacker-drag. These are non-essentials.

The stacker swings horizontally on a vertical pivot, exemplified in this instance by turntable 21 and pivot 22, and the section 3 is held against vertical swing by a brace-rod 23. As the stacker swings from side to side the table moves under the discharge end of the pan, and the pan receives horizontal reciprocating motion from the chaffer-shoe, and as the extended portions of the table pass under the pan the movements of the pan force the straw off the horizontal ledges and into the drag. The pan may be hinged to a shaker-shoe somewhat higher or lower than the table of the shaker, and this feature is convenient in enabling the connection of the stacker with separators of the different makes.

I claim as my invention—

1. The combination with a shaker-shoe of a separator and with a centrally-depressed and horizontally-swinging straw-receiving table of a stacker, of a drag-belt running in the depression of the table, and a pan resting adjacent to the table and partaking of the shaking motion of the shoe.

2. The combination with a shaker-shoe of a separator and with a centrally-depressed and horizontally-swinging straw-receiving table of a stacker, of a drag-belt running in the depression of the table, and a pan hinged at its front end to the shaker-shoe and supported at its rear end adjacent to the table.

3. The combination with a shaker-shoe of a separator and with a horizontally-swinging straw-receiving table of a stacker, of a pan hinged at its front end to the shaker-shoe and extended above the table, and a strip on the rear end of the pan extending downward to near the table.

4. The combination with a shaker-shoe of a separator and with a centrally-depressed and horizontally-swinging straw-receiving table of a stacker, of a drag-belt running in the depression of the table and a corrugated pan hinged at its front end to the shaker-shoe and supported at its rear end adjacent to the table.

5. The combination, with the straw-delivering portion of a separator, a horizontally-swinging straw-receiving stacker-table hav- a medial depression, and a drag-belt running in said depression, of a movable straw-transferring means arranged to receive straw from the delivering portion of the separator and deliver it to the said depression.

6. The combination, with the straw-delivering portion of a separator, a horizontally-swinging straw-receiving stacker-table having a medial depression, and a drag-belt running in said depression, of a reciprocable straw-transferring pan extending between the straw-delivering portion and the medial depression to deliver the straw from said delivering portion of the separator to the medial depression, for the purpose set forth.

7. The combination, with the straw-delivering portion of a separator, a horizontally-swinging straw-receiving stacker-table having a medial depression, and a drag-belt running in said depression, of a movable straw-transferring means arranged to receive straw from the delivering portion of the separator and deliver it to the said depression, and means for scraping material from said table into the medial depression.

8. The combination, with the straw-delivering portion of a separator, a horizontally-swinging straw-receiving stacker-table having a medial depression, and a drag-belt runging in said depression, of a reciprocable straw-transferring pan extending between the straw-delivering portion and the medial depression to deliver the straw from said delivering portion of the separator to the medial depression, and a scraper carried by said pan to scrape material from the table into the medial depression, for the purpose set forth.

MARTIN HEINEKE.

Witnesses:
J. H. MATHENY,
ROBERT MATHENY.